United States Patent [19]

Schoch, Jr. et al.

[11] Patent Number: 5,772,820
[45] Date of Patent: Jun. 30, 1998

[54] PROCESS FOR FABRICATING A MICROWAVE POWER DEVICE

[75] Inventors: Karl F. Schoch, Jr., Pittsburgh; Theodore R. Vasilow, Irwin, both of Pa.; Andrew J. Piloto, Columbia, Md.; Deborah P. Partlow, Export; Kenneth C. Radford, N. Huntingdon, both of Pa.

[73] Assignee: Northrop Grumman Corporation, Los Angeles, Calif.

[21] Appl. No.: 685,885

[22] Filed: Jul. 25, 1996

Related U.S. Application Data

[63] Continuation-in-part of Ser. No. 511,927, Aug. 7, 1995.
[51] Int. Cl.$^6$ .............................. B32B 31/26; H01P 1/387
[52] U.S. Cl. ...................... 156/89; 156/244.18; 156/246; 156/248; 156/264; 333/1.1
[58] Field of Search ...................... 156/89, 247, 244.11, 156/246, 264, 244.18, 248; 264/61; 333/1.1, 24.1; 501/109, 110, 112, 126; 423/594

[56] References Cited

U.S. PATENT DOCUMENTS

| | | |
|---|---|---|
| H000432 | 2/1988 | Mariani et al. ......................... 333/205 |
| 3,588,759 | 6/1971 | Buck et al. ............................. 333/24.1 |
| 3,602,845 | 8/1971 | Agrios et al. .......................... 333/24.1 |
| 3,637,505 | 1/1972 | Micheli . |
| 3,715,692 | 2/1973 | Reuss, Jr. ............................... 333/24.1 |
| 3,753,162 | 8/1973 | Charlton et al. ....................... 333/24.1 |
| 3,854,993 | 12/1974 | Harris et al. . |
| 3,864,165 | 2/1975 | Braginski . |
| 3,956,440 | 5/1976 | Deschamps et al. . |
| 3,986,149 | 10/1976 | Harris . |
| 4,440,713 | 4/1984 | Rigby ................................... 423/594 X |
| 5,091,348 | 2/1992 | Woodhead et al. . |
| 5,379,004 | 1/1995 | Marusawa et al. ................... 156/89 X |
| 5,450,045 | 9/1995 | Miura et al. ............................ 333/1.1 |
| 5,459,439 | 10/1995 | Marusawa et al. ................... 156/89 X |
| 5,498,999 | 3/1996 | Marusawa et al. ................... 156/89 X |
| 5,662,879 | 9/1997 | Schoch, Jr. ............................. 423/594 |

FOREIGN PATENT DOCUMENTS 0 429 088  5/1991  European Pat. Off. .

OTHER PUBLICATIONS

Economos, G. "Magnetic Ceramics: I, General Methods of Magnetic Ferrite Preparation," J. American Ceramic Society, vol. 38, No. 7, pp. 241–244.

Wickham, D.G. "Metal Iron(III) Oxides," Inorganic Synthesis, vol. 9, pp. 152–156.

Barriga, C. et al., "Lithium Ferrite Formation by Precipitation from Fe(III) Solutions," J. Sol. State Chem., vol. 77, pp.132–140.

"Electrical, Mechanical and Thermal Characterization of a Cofired, Multilayer Substrate Processed from Sol–Gel Silicia", by Lloyd Sanchez, Ceram Eng. Sci. Proc., 9 [11–12] pp. 1590–1602 (1988).

"Thin Ferrite Devices for Microwave Integrated Circuits", by Gerard T. Roome and Hugh A. Hair, IEEE Transactions on Microwave Theory and Techniques, Jul. 1968.

"Slot Line Application to Miniature Ferrite Devices", by Gerald H. Robinson and James L. Allen, IEEE Transactions on Microwave Theory and Techniques, Dec. 1969.

"Ferromagentic Parts for Microwave Integrated Cricuits", by Gordon R. Harrison, Gerald H. Robinson, Bruce R. Savage and Donald R. Taft, IEEE Transactions on Microwave Theory and Techniques, vol. MTT–19, No. 7, Jul., 1971.

(List continued on next page.)

Primary Examiner—Curtis Mayes
Attorney, Agent, or Firm—Walter G. Sutcliff

[57] ABSTRACT

Materials and methods for the fabrication of high density, low temperature fired microwave ferrites for use in microwave power devices, transmission line elements, isolators, circulators, and phase shifters. Very fine (sub-micron) ferrite powders made by sol-gel methods are mixed with solvents and binders then tape-cast. Ferrite tapes in the unfired state are cut into complex shapes and may be provided with via holes. These ferrite sheets are fired discretely, or are laminated, cofired with printed metal pastes, or other active and passive ceramic tapes.

16 Claims, 4 Drawing Sheets

OTHER PUBLICATIONS

"A Slow Wave Digital Ferrite Strip Transmission Line Phase Shifter", by R.R. Jones, IEEE Transactions on Microwave Theory and Techniques, Dec. 1966.

"A Reciprocal TEM Latching Ferrite Phase Shifter", by J.W. Simon, W.K. Alverson and J.E. Pippin, IEEE, 1966.

"A Digital Latching Ferrite Strip Transmission Line Phase Shifter", by L.R. Whicker and R.R. Jones, IEEE Transactions on Microwave Theory and Techniques, Nov., 1965.

PROCESS FOR FABRICATING A MICROWAVE POWER DEVICE

BACKGROUND OF THE INVENTION

Related Application

This application is a continuation-in-part of copending application Ser. No. 08/511,927, entitled Planar Phase Shifters Using Low Coercive Force and Fast Switching, Multilayerable Ferrite, filed Aug. 7, 1995.

1. Field of the Invention

This invention relates generally to microwave elements such as isolators, circulators, phase shifters and transmission line elements and more particularly to such elements fabricated with cofirable ferrite tapes.

2. Description of the Prior Art

Polycrystalline ferrite components for microwave applications are usually made by traditional ceramic processes using ceramic powders which are formed by prereaction of constituent oxides or carbonates at high temperature, that is, greater than 1000° C. One of the most versatile of these ferrites is magnesium ferrite, which possesses the structure of the mineral spinel, $MgAl_2O_4$, where iron (Fe) replaces the aluminum (Al) atom in the crystal lattice. The versatility of basic magnesium ferrite for microwave applications is demonstrated by the range of magnetic properties available by substitution of divalent ions other than Mg in the spinel structure.

The transition elements Mn, Fe, Co, Ni, Cu and Zn, and also Li, Ba, and Cd are examples of other elements which, when substituted singly or in combination in ferrite compositions, also form various ferrites, for example $MnFe_2O_4$, $NiFe_2O_4$, and $Li_{0.5}Fe_{2.5}O_4$. When they are combined, these materials are referred to as mixed ferrites, mixed crystals or solid solution ferrites. Manganese and zinc are two common elements which are substituted in these ferrites to increase the resistivity and the magnetization, respectively. Aluminum and titanium are used to reduce the magnetization. In lithium ferrite, the addition of Co can change the sign of the anisotropy constant of the material and also provides a range of spin wave line widths. The inclusion of nickel improves magnetic hysteresis loop squareness.

The cation distribution in the spinel lattice in practical combinations of mixed ferrites defines the properties, and can be affected by firing conditions (temperature, atmosphere, and cooling rate). Lithium ferrites are susceptible to lithium loss at elevated temperatures (>1000° C.) and magnesium and lithium ferrites exhibit oxygen nonstoichiometry at high temperatures. Magnesium and lithium ferrites can be fired in air. Manganese ferrites usually require control of oxygen partial pressure during firing. The sintering temperature for magnesium ferrite is normally high, greater than 1250° C. especially when the starting powder is made by conventional means. The sintering temperature of lithium ferrite is typically <1000° C.

Conventional ceramics are made by mixing the oxides or carbonates, calcining, and then milling the reactant. This may be repeated a number of times to achieve chemical homogeneity. For example, iron oxide and magnesium carbonate powders in the proper ratios are ball milled to mix and pulverize the powders and are then calcined within the range of 1000° C. to 1450° C. The reaction product is again milled and is then spray-dried with a dry pressing binder. The spray dried powder is pressed into a bar or similar shape and fired at 1200°–1400° C. whereupon it becomes hard and dense. Final characterization, cutting and machining follow.

The machined ferrite shape is then metallized with gold by sputtering, screen printing, or similar methods, which produces the desired microwave circuitry.

Ferrites made by conventional methods are subject to variability in each of the many processing steps, and without very careful process control, their dielectric and magnetic properties vary, and their dielectric losses are higher than desired. The effect of this variability is that the microwave system in which the ferrite is employed does not perform optimally. This is especially true in systems using large antenna arrays, where matching antenna and transmission line elements to close tolerances is required.

For some microwave system components, small and uniform grain size is critical for optimum functioning of the ferrite, however, heat treatment of the ferrite powders causes grain growth. The fine and uniform sub-micron-sized particles desired can never be achieved with these powders, even with extensive milling. Therefore, conventional processing of ferrites yields grains that are already large, limiting the ultimate performance of the ferrite device and system.

Moreover, the magnesium ferrite powders of the prior art are fired at high temperatures in excess of 1200° C. to achieve high density, and this prevents co-firing with metals such as gold, as well as cofiring with most other ceramics used in microwave packaging because of chemical interaction at these high temperatures.

Co-precipitation of ferrites has been known since the mid-1950s via the oxidation of mixed metal hydroxides (G. Economos, *J. Am. Ceram. Soc.*, 38,241, (1955)). In the hydroxide method, metal salts such as the chlorides or sulfates are dissolved in hot deaerated water. Base is added to raise the pH above 8. The resultant mixed hydroxides are oxidized to form the ferrite structure using air or oxygen. The reaction conditions affect the particle size and morphology, while the composition is determined by the ratio of the metal salts. Wickam (*Inorg. Synth.*, 9,152 (1967)) and Paris (Thesis, University of Lyon, 1963) describe examples of preparing magnesium ferrites from oxalates.

Because of the solubility of lithium hydroxide and oxalate, the hydroxide and oxalate methods are more difficult to control for lithium ferrites. However, lithium ferrite is also a very versatile ferrite; its magnetic properties can be altered to cover a wide range of values. It differs from magnesium ferrite because it can be fired to high density at less than 1000° C. Compositions containing metals such as zinc substituted for part of the iron oxide, and bismuth oxide as a sintering aid are shown to densify at low temperature by D. W. Johnson et. al., ("Effect of Preparation Technique and Calcination Temperature on the Densification of Lithium Ferrites", *Bul. Am. Cer. Soc.*, v.53,2, 1974.) These authors evaluated powders made by conventional(oxide) or non-conventional means, such as precipitation, spray pyrolysis, and freeze drying. A. Micheli coprecipitated lithium stearate and metal hydroxides ("Preparation of Lithium Ferrites by Co-precipitation," IEEE Trans. on Magnetics, p.606–608, Sept. 1970). Pechev and Pecheva spray dried lithium-iron formate solutions and calcined the product to form uniform ferrite powder ("*A Study of Sintering and Magnetic Parameters of Spinel Lithium Ferrite*", Mat. Res. Bull., Vol. 15, pp 1199–1205, 1980). Oda, et. al. ("Preparation of $LiFe_5O_8$ by the Sol-Gel Method", *J. Mat. Sci. Let.*, 5, 1986 545–548) derived ferrite from alkoxides of lithium and iron. C. Barriga, et. al., describe a variant of the precipitation method ("Lithium Ferrite Formation by Precipitation from Fe(III) Solutions, *J. Sol. State Chem*, 77, 132–140, (1988)).

The above methods describe non-traditional routes to making ferrite powder, but do not demonstrate application to a device manufacturing process or use as a microwave element, particularly a cofired element where the metal circuitry is fired with the ceramic.

Cofired non-ferrite ceramic packages have been demonstrated by Sanchez ("Electrical, Mechanical, and Thermal Characterization of a Cofired, Multilayer Substrate Processed from Sol-Gel Silica", Ceram. Eng. Sci. Proc., 9 [11–12] (1590–1602), 1988. A low dielectric constant substrate using quartz filler and boron in a $CaOB_2O_3$—$Al_2O_3$ glass was developed by Westinghouse (Gurkovich, et. al., "Low Dielectric Constant, Alumina Compatible Co-fired Multilayer Substrate", Ceram. Eng. Sci. Proc., 9 [11–12] (1567–1578), 1988). These types of ceramic substrates are commonly made by tape casting, a process that evolved from the work of Howatt, et al. ("Fabrication of Thin Ceramic Sheets for Capacitors", J. Amer. Cer. Soc., 30, (237–242), 1947).

A typical tape casting slurry composition is prepared by dispersing glass or ceramic powder in a vehicle containing binder and plasticizer, which provide unfired strength and lamination properties, and solvents, such as alcohol and an aromatic hydrocarbon. This slurry is cast on a carrier belt and leveled under a blade that controls the width and thickness. Ceramic capacitors today are made mainly by tape casting. The substrates of Sanchez and others are directed exclusively toward low dielectric constant packaging materials or capacitors and are inapplicable to circulators, phase shifters and the like. Cofired multilayer packages are passive materials which act as housings for active devices. In contrast, ferrites are used as microwave circuit elements. These include active devices such as phase shifters and circulators and isolators for microwave RF applications.

Some specific types of microwave devices will now be discussed. As part of this discussion, the prior art methods of fabricating these devices will be addressed as well as the design considerations and drawbacks associated with these prior art devices.

Currently available circulators and isolators are UHF or microwave three-port devices that connect the transmitter and receiver to a common antenna or feedline. Their operation is based on the principles of gyromagnetism. Assemblies of circulators and isolators are used to interface transmit/receive modules with antenna elements and direct the radio frequency (RF) energy, and are therefore critical parts of radar systems. Important considerations for the design of circulator assemblies are: low cost, low loss, high uniformity of magnetic and dielectric properties, and high isolation. Conventionally prepared polycrystalline ferrites contain chemical and microstructural non-uniformities, especially large pores, which make the circulator performance, and subsequent system performance less than optimum for many applications. High fired density is critical to consistent circulator performance.

Circulators incorporate prefired ferrite materials onto which thin film metallization is applied and a magnet is then attached. Interface to the radiating element is made through a physically attached polymeric composite, Duroid or polyimide. In some cases, the ferrite is embedded in another dielectric medium such as prefired alumina ($Al_2O_3$) prior to the attachment to Duroid. The disadvantages of this approach are due to the machining, handling, and attachment techniques associated with fired, refractory (high temperature fired) ceramic materials, both alumina and ferrite, and the Duroid materials. Several interconnects are used to provide an electrical path from the ferrite to either end of the lower dielectric constant material and to the required 50Ω resistive loads or transmit/receive (T/R) paths. Such interconnects result in low assembly yield. Although the traditional circulator configurations can satisfy some system requirements, they have significant negative impact on the subarray architecture, radar cross section (RCS) performance and subarray producibility.

Phase shifters are devices in which the phase of an electromagnetic wave of a given frequency propagating through a transmission line can be shifted. Such phase shifters have been utilized in radar applications such as electronic beam steering and phased array applications. Two main types of electronic phase shifters are currently employed for phased arrays: ferrite phase shifters and solid state semiconductor phase shifters. Construction of ferrite phase shifters falls into two general categories: phase shifters enclosed with a waveguide structure and phase shifters built using transmission line microstrip configurations. Ferrite phase shifters use ferromagnetic materials from both ferrite and garnet families which are basically magnetic ceramic materials with high resistivity and low dielectric and magnetic loss.

Toroid phase shifters are most commonly used because of their high phase shift per decibel (dB) of loss. Toroidal phase shifters use a toroid geometry consisting of a ferromagnetic toroid located within a section of waveguide. Toroid phase shifters, however, are difficult to fabricate at low cost because of the extruded and machined rectangular ferrite tubes used to provide a closed magnetic latching circuit and due to the tight dimensional tolerances involved.

Planar phase shifters use transmission line microstrip configurations that unlike toroids, require little or no machining. However, prior fabrication techniques have resulted in less than satisfactory results. One way known in the art to fabricate a planar phase shifter is to prefire ceramic components of the device, such as a monolithic block of ceramic as a substrate, and to then affix the metal components thereto, such as is described in U.S. Pat. No. 3,986,149 to Harris et al. The Harris et al. patent discloses bonding metal ground planes to a ferrite block, masking the groundplanes and then depositing ferrite by arc plasma spraying between the groundplanes. The drawbacks associated with this technique include the inability to provide for 3-dimensional internal metal circuitry in the fabricated structure. The Harris et al. patent also requires high-temperature diffusion bonding to join the elements to the ceramic block, resulting in adverse effects on the grain structure of the ceramic and possible changes in chemical composition, i.e., magnetic performance. Furthermore, this approach makes it difficult to incorporate active semiconductor components such as the silicon drivers circuits, for example required.

Phase shifter performance is greatly dependent on the ceramic microstructure; grain size and porosity must be carefully controlled. The smaller the grain size the lesser the switching time and generally speaking the larger the grain size the lower the required drive field. Therefore, it is preferred to utilize ferrite grains that are sufficiently small for rapid switching, but not so small that excessive drive fields are necessary.

SUMMARY OF THE INVENTION

Methods of producing microwave power devices (i.e., isolators, circulators, phase shifters and transmission line elements) are provided in which multiple layers of a ferrite form the devices. The preferred ferrites are magnesium and lithium ferrite. Selected layers of the ferrite are patterned with a conductor, and the multiple layers of ferrite and conductor are cofired. The conductor is preferably gold, silver, copper or alloys thereof.

Superior ferrite circulators and isolators are needed for advanced active phased array radar systems that function over 40% of X-band (for emerging fire control radar systems), and potentially even wider bandwidths covering both X and $K_u$ band (multifunction, shared aperture systems). In addition, advanced phase shifters are required to meet advanced radar system performance requirements, for example, high remanent magnetization and switching speeds. The piece to piece and lot to lot uniformity in ferrite properties are critical for these advanced systems. In addition to meeting the performance requirements, flexibility in the ferrite element design and packaging is required while maintaining the economies of scale (lower cost) associated with mass production. Ferrite components using chemically prepared powders in multilayerable tape form provide this flexibility. Ferrites with fine uniform grain size resulting from precipitated powders fire to high density with minimal porosity.

Lower-temperature firing microwave ferrites, particularly magnesium ferrites synthesized by SOL-GEL technology in combination with tape casting technology, permit the use of high-conductivity metal thick film pastes that can be cofired with ceramics. These metals include gold, silver and copper having respectiave melting temperatures of 1062.7° C. for gold, 960.5° C. for silver and 1082.7° C. for copper. Therefore, cofiring temperatures of approximately 800° C. to 1000° C. are used, depending upon the metal.

The microwave devices are fabricated using ferrite powder, preferably obtained through chemical precipitation in a water-based system using high purity starting materials. Powder preparation via precipitation reduces the number of preparation steps and reduces the end product variability. Two principle methods are used: precipitation and oxidation of sulfates using a base such as tetramethyl ammonium hydroxide; and precipitation of a salt of oxalic acid from a solution of mixed acetates (oxalate process). The precipitated ferrite powder is then rinsed and dried. Powders with BET surface areas from 10 to 200 $m^2/g$ are prepared by these methods. In practice it is generally difficult to tape cast powders with surface areas greater than 100 $m^2/g$ unless they are not fully dispersed, that is, agglomerated, which hinders densification. After drying, the powder is calcined or heated, preferably to a temperature of approximately 200° C. to 800° C. to remove the base from the sulfate process, or CO, $CO_2$ and water for the oxalate precursor.

Below are examples of magnesium ferrite compositions made using sulfate or oxalate methods.

TABLE 1.1

| Weight Percent of Ferrite Constituents (as oxides) | | | | | | |
|---|---|---|---|---|---|---|
| MgO | ZnO | CuO | $Al_2O_3$ | $MnO_2$ | $Fe_2O_3$ | Total |
| 26.00 | 0.00 | 0.00 | 3.90 | 6.00 | 64.10 | 100.00 |
| 20.00 | 8.00 | 0.00 | 0.00 | 6.00 | 66.00 | 100.00 |
| 23.00 | 5.00 | 0.00 | 0.00 | 6.00 | 66.00 | 100.00 |
| 27.00 | 0.00 | 0.00 | 0.00 | 6.00 | 67.00 | 100.00 |
| 29.70 | 0.00 | 0.00 | 0.00 | 2.50 | 67.80 | 100.00 |
| 25.50 | 0.00 | 0.50 | 0.00 | 6.00 | 68.00 | 100.00 |
| 26.00 | 0.00 | 0.00 | 0.00 | 6.00 | 68.00 | 100.00 |

TABLE 1.1-continued

| Weight Percent of Ferrite Constituents (as oxides) | | | | | | |
|---|---|---|---|---|---|---|
| MgO | ZnO | CuO | $Al_2O_3$ | $MnO_2$ | $Fe_2O_3$ | Total |
| 28.00 | 0.00 | 0.00 | 0.00 | 4.00 | 68.00 | 100.00 |
| 29.50 | 0.00 | 0.00 | 0.00 | 2.50 | 68.00 | 100.00 |
| 30.00 | 0.00 | 0.00 | 0.00 | 2.00 | 68.00 | 100.00 |
| 28.00 | 0.00 | 0.00 | 0.00 | 2.50 | 69.50 | 100.00 |
| 26.00 | 0.00 | 0.00 | 0.00 | 2.50 | 71.50 | 100.00 |
| 22.70 | 0.00 | 0.00 | 0.00 | 5.30 | 72.00 | 100.00 |
| 26.00 | 0.00 | 0.00 | 0.00 | 1.50 | 72.50 | 100.00 |
| 23.50 | 0.00 | 0.00 | 0.00 | 2.50 | 74.00 | 100.00 |

A lithium ferrite to be used with this invention is $Li_{0.3}Zn_{0.4}Mn_{0.05}Fe_{2.25}O_4$. Zinc is included in this ferrite to provide a saturation magnetization ($4\pi M_s$) of approximately 4700 Gauss. The Zinc level can be reduced to lower the magnetic saturation. Other elemental substitutions can be made to provide a range of $4\pi M_s$ values from 0–5000 G. A number of dopants may be used to "fine tune" or adjust the characteristics of the ferrite. Cobalt modifies magnetocrystalline anisotropy and minimizes line width, and generally is used to enhance the power handling capability. Copper (Cu) generally reduces magnetostriction and improves squareness. Indium (In) is added to reduce anisotropy. Zirconia (Zr) is generally added to reduce anisotropy, and grain size. Tin (Sn) is a large octahedral site substituting element. Yttrium is a small sized rare earth; the lighter rare earths such as praseodymium generally couple ferromagnetically, while the heavier rare earths such as dysprosium couple antiferromagnetically. These rare earths can be included to reduce anisotropy, coercive force, and magnetostriction. Some general examples of lithium ferrites include the following, where the dopant is less than 5% and typically less than 1% of the composition, and where RE is a rare earth element:

TABLE 1.2

$Li_{0.3-c/2}Zn_{0.4}Mn_{0.05}Fe_{2.25}Co_cO_4$
$Li_{0.3-c/2}Zn_{0.4}Mn_{0.05}Fe_{2.25}Ni_nO_4$
$Li_{0.3}Zn_{0.4}Mn_{0.05}Fe_{2.25-r}RE_rO_4$
$Li_{0.3+t/2}Zn_{0.4}Mn_{0.05}Fe_{2.25-3t/2}Zr_tO_4$
$Li_{0.3-u/2}Zn_{0.4}Mn_{0.05}Fe_{2.25-u/2}Cu_uO_4$
$Li_{0.3+s/2}Zn_{0.4}Mn_{0.05}Fe_{2.25-3t/2}Sn_sO_4$
$Li_{0.3}Zn_{0.4}Mn_{0.05}Fe_{2.25-i}IN_iO_4$

Ferrite tapes are preferably made by tape casting, a doctor blade process. In this method the ferrite powder is dispersed in a vehicle containing a binder such as polyvinyl butyral, a plasticizer such as butyl benzyl phthalate, and one or more solvents, typically a mixture of alcohol and an aromatic hydrocarbon, to form a homogenous slurry. The preferred vehicle containing 100 parts by weight ferrite contains 150 to 300 parts by weight solvent, 0.5 to 10 parts by weight menhaden fish oil (dispersant), 10–20 parts by weight plasticizer (Monsanto Santicizer-160 or Union Carbide polyethylene glycol, or a mixture of the two), and 10–20 parts by weight binder (Monsanto B-98 or B-79). The exact amounts depend on the powder type, and are particularly dependent on the powder surface area. Powders with surface areas as high as 100 $m^2/g$ can be cast if enough binder and plasticizer are used to impart flexibility to the tape. A thin layer of the slurry is applied to a moving carrier belt such as polyethylene terephthalate (Dupont Mylar or equivalent) preferably using a doctor blade process. The slip is then dried and the backing material is removed, leaving a flexible ferrite tape.

Besides tape casting, other means of forming the sheets of ferrite that could be utilized include extrusion, calendaring, or roll compaction. The fabrication of thin tape sheets also allows thin pieces to be made, thus reducing the costs associated with machining thick pressed pieces to the desired dimensions. The ceramic tape layers can be cast to a precise thickness. This allows controlled impedances of the microstrip and/or stripline transmission lines, which provides lower insertion loss and decreased crosstalk compared to conventional waveguide devices. Ferrite sheets are metallized with conductor patterns that form the multilayer circuits by any suitable method, but preferably by thick film screen printing. Layers of ferrite having conductive metal deposited thereon may be heated prior to the subsequent stacking and lamination steps to remove solvents in the metal paste, typically to temperatures ranging from 35° C. to 100° C. The unfired ferrite tape has some porosity, that traps the printed conductor before the lamination operation. The result is less "spreading" of the conductor; therefore, higher line definition can be achieved using unfired tape than conventional thick film dielectric. Four (4) mil lines and three (3) mil spaces between lines on as many as seventy-five (75) layers are easily achieved through this process.

Vias or holes may also be placed through selected layers of tape. The vias may provide openings through the device, or conductive metal may be placed in the vias to provide vertical connections through the layers. In this way, metal may be formed three dimensionally within and around the ferrite. The metal may form the ground plane of a phase shifter, coils, slotline and stripline, as well as circulator elements and impedance matching circuitry. Vias in the tape are either laser drilled at speeds up to 50 vias per second or mechanically punched at speeds approaching 8 vias per second prior to the firing process. Unlike the conventional thick film technology, either of these approaches lends itself to extremely high production volume and yields.

The tape layers are then stacked in a predetermined order to properly align the printed circuitry, and are laminated. The lamination process involves pressing the layers together, usually under a controlled pressure, typically 1000 to 10000 psi, and usually at an elevated temperature, typically 50° C. to 75° C. The laminated stack of layers is then fired to a temperature of approximately 800° C. to 1050° C., sintering the laminated layers into one integrated structure.

Any number of layers of tape may be utilized in the construction of the microwave devices. For example, with respect to the preferred embodiments described herein it is preferred that approximately two to twenty layers be used. For the purposes of constructing a planar phase shifter, multiple layers are used to integrate both the microwave transmission media and the DC windings. Traditional single layer structures on materials like alumina, GaAs, or silicon limit the number of elements that can be produced because of the lack of area to manipulate the proper line lengths that must be maintained between elements. In contrast, the disclosed multilayer designs facilitate the use of numerous elements within a given structure, i.e., integrated DC windings, microwave/millimeter transmission media, and physical structure. In addition, lines can be isolated from each other by using a separate layer with ground planes located between active layers.

While magnesium and lithium ferrites are preferred, other ferrites which are normally fired at high temperatures can also be prepared so that low temperature sintering can be achieved. Examples of these compositions are barium hexaferrites, and nickel ferrites. An additional advantage of chemically prepared powders is that the ferrite grain size can be manipulated over a significant range. The diffusion processes that govern densification and grain growth are thermally activated, but their rates are generally different; densification is largely attributed to volume diffusion, whereas grain growth is largely due to surface diffusion. By firing ultrafine chemically prepared ferrites, full densification can be achieved with little grain growth. Grains on the order of 10 times smaller than with the conventional sintering result. This provides a very important improvement in the power handling capability of the ferrites, where small grain size is beneficial. In some applications, larger grain size is required, which can be difficult to achieve at the low sintering temperature of approximately –1000° C. required for gold metallization. In these cases, the addition of sintering aids, for example Cu or Bi, added at low levels, typically less than 3%, enhance surface diffusion and increase the rate at which grain growth occurs. These additives can be uniformly included during the chemical (SOL-GEL) processing of the ferrites as previously described. Even in cases where larger grain size is desired, better uniformity, density, and grain size control are achieved by starting with a fine powder of uniform particle size.

Overall multilayering capability of the ferrite material allows for composite electrical requirements to be handled within a single substrate, thus solving many producibility and integration requirements for a low cost planar phase shifter.

The presently disclosed invention may be utilized to fabricate such microwave devices as isolators, circulators, phase shifters and transmission line elements. Some preferred embodiments of phase shifters are shown and described herein. Embodiments of circulators which may be fabricated according to the present invention are shown and described in application Ser. No. 08/682,873 abandoned, entitled Cofired Ferrite Lumped Element Circulator, which is incorporated herein by reference.

Other objects and advantages of the invention will become apparent from a description of certain present preferred embodiments thereof shown in the drawings.

DETAILED DESCRIPTION OF THE PREFERRED EMBODIMENTS

The ferrite microwave devices and elements are preferably fabricated according to the following steps.

Precipitation of Ferrites

In this example, magnesium ferrite with zinc and manganese substitutions is produced by two precipitation procedures, both of which were found suitable for large-scale production, provided that procedures described below are followed.

Mixed Oxalate Precipitation

Generally following the procedure of Wickham, mixed oxalate salts were prepared in the following manner. $Mg(OAc)_2 \cdot 4H_2O$ and $Mn(OAc)_2 \cdot 4H_2O$ were dissolved in 11M aqueous acetic acid. This solution was deaerated with flowing nitrogen overnight. Iron powder was then added to the solution, which was then heated to reflux overnight under nitrogen. At the same time, another aqueous solution was prepared having a 2% excess (based on total metals content) of oxalic acid. The proportions of the reagents used in each case are given in Table 2.1. After the iron was completely dissolved, the oxalic acid solution was added quickly to the acetates under nitrogen. The solution was brought to reflux again and then allowed to cool slowly to room temperature. Immediately upon addition of the oxalic acid solution, a yellow precipitate formed. When the reaction had cooled, the precipitate was washed with water several times and collected by filtration. The dry powder was calcined in air at 600° C. Temperatures from 400° C. to 900° C. are suitable; complete decomposition of the oxalates is typically complete at 575° C. The ferrite chemistry is approximately $Mg_{1.18}Mn_{0.14}Zn_{0.13}Fe_{1.70}O_4$.

TABLE 2.1

Acetate Solution:

| | |
|---|---|
| Fe Powder | 10.6 g |
| $(Mg(OAc)_2 4H_2O$ | 28.0 g |
| $Mn(OAc)_2$ | 4.0 g |
| $Zn(OAc)_2\ 2H_2O$ g | 3.0 g |
| 1:1 HOAc/water | 400 ml |

Oxalic Acid Solution:

49.0 g $C_2O_4H_2\ 2H_2O$
220.0 ml $H_2O$

Ferrite Preparation via Hydroxide Precipitation

Figure 1:
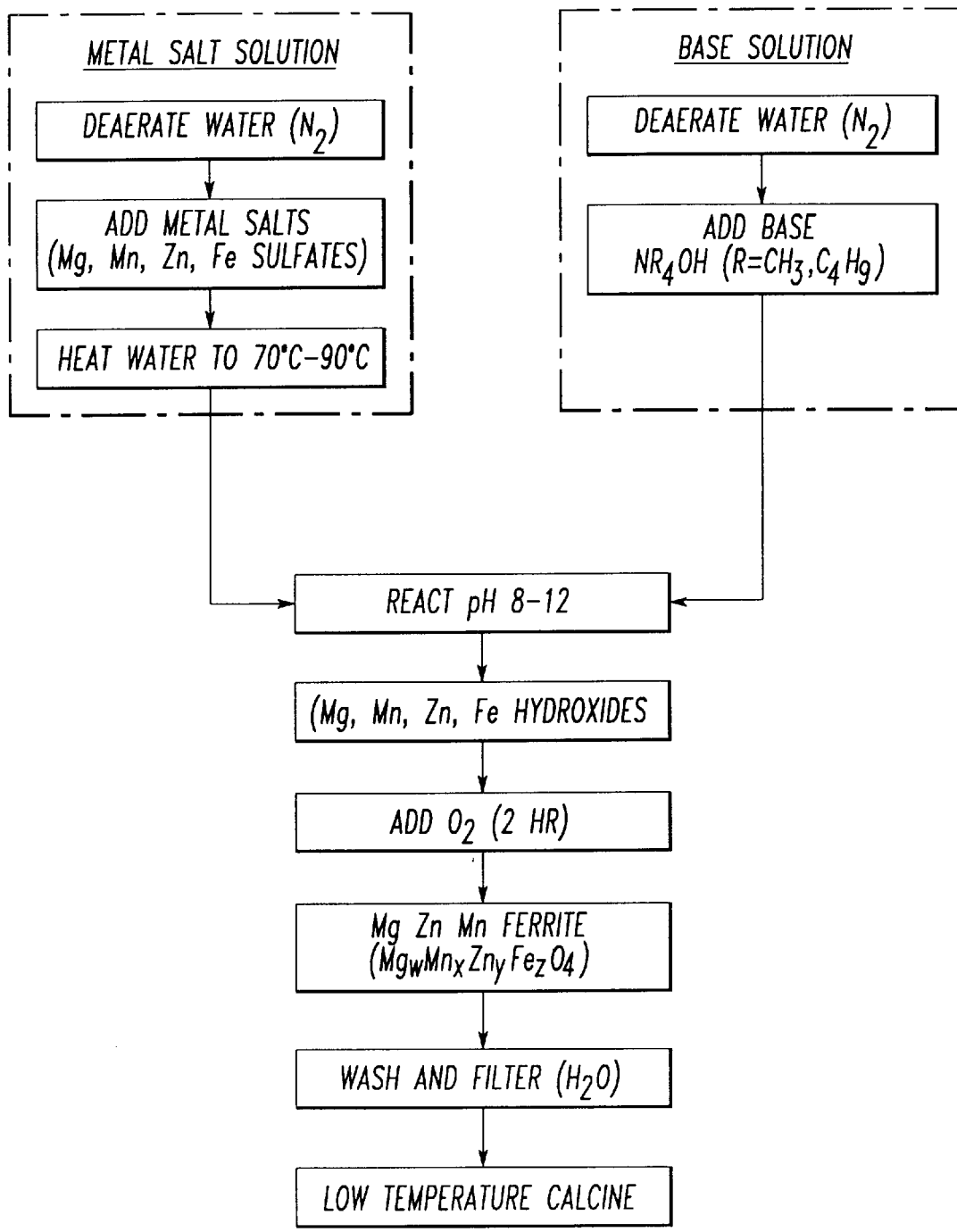
FIG. 1 is a schematic of the hydroxide precipitation process.

Referring generally to FIG. 1, the second method is by precipitation of a hydroxy-gel from sulfates using one of several organic bases. Tetraethyl ammonium hydroxide, tetramethyl ammonium hydroxide, or tetrabutyl ammonium hydroxide is added to a solution of magnesium, zinc, manganese, and iron sulfates, apportioned in the correct ratios. The solution is prepared in a nitrogen atmosphere using water that is free of carbon dioxide and oxygen gases, to retain the iron as $Fe^{2+}$ ions. After a gel has formed, oxygen gas is bubbled through the material to convert the hydroxy-gel to the ferrite (spinel) directly. The SOL is then washed, filtered, dried, or calcined at a low temperature.

In the sulfate method of precipitation, 54.839 g of $FeSO_4\cdot 7H_2O$, 2.78 g of $MnSO_4,H_2O$, 33.56 g of $MgSO_4\cdot 7H_2O$, and 2.64 g of $ZnSO_4\cdot H_2O$ are dissolved in 400 ml of nitrogen saturated water which has been purged of dissolved oxygen. This solution is heated to 70° C. and 400 ml of 55% $N(C_4H_9)OH$ in water is added while mixing to precipitate the hydroxide as a gel. When the temperature has stabilized at 70° C., $O_2$ gas is bubbled through the solution at a rate of 200 cc/min. for a period of four hours. The precipitated product is collected by filtration and washed with water. After drying at 250° C. for several hours, the dry cake is milled to a fine powder and used for tape casting. The ferrite formula is approximately $Mg_{1.18}Mn_{0.14}Zn_{.013}Fe_{1.70}O_4$.

Powders made by these methods are approximately 0.5 and 0.02 microns in diameter, depending on the exact precipitation and calcination conditions, and can possess surface area of between 10 and 200 $m^2/g$, also depending on the precipitation conditions. These powders can be sintered to more than 95% density at 1000° C. or less. The sulfate derived powder exhibits the spinel structure as precipitated, with no evidence of second phases present. The oxalate after calcining also exhibits the ferrite structure at 600° C. Infrared spectroscopy, however, has indicated that there is residue from the oxalate in the calcined oxalate, up to at least 575° C.

Ferrite Tape Fabrication

The preferred casting vehicle contains 100 parts by weight ferrite, 100–150 parts by weight solvent, 0.5 to 10 parts by weight menhaden fish oil (dispersant), 10–20 parts by weight plasticizer (Monsanto Santicizer S-160 or similar phthalate type, or polyethylene glycol or a mixture of phthalate and glycol plasticizers), and 10–20 by weight binder (Monsanto B-98 or equivalent). The exact amounts depend on the powder type, and are particularly dependent on the powder surface area. Preferred amounts per hundred weight of ferrite are 3.5 parts menhaden fish oil, 7.0 parts plasticizer (Santicizer S-160), and 7.0 parts binder(B-98). Powders with surface areas as high as 100 $m^2/g$ can be cast if enough binder and plasticizer are used to impart flexibility to the tape. The powder and vehicle are milled in a suitable ball mill or vibratory mill using standard ceramic processing techniques. Milling time is at least 16 or more hours for a ball mill, less for a vibratory mill.

A suitable tape casting machine with heated bed is used for tape fabrication. A carrier film of polyethylene terephthalate (PET) is fed from a roll, under a doctor blade, over the heated bed and is rolled up at the other end, approximately 20 feet away. The ferrite slip is pumped into the doctor blade reservoir and is cast upon the polyethylene terephthalate backing into a thin sheet by a doctor blade process, i.e., slip is provided upon the backing, the backing is moved relative to the doctor blade. Casting speed is 0.5 to 2.0 feet per minute, with 0.75 to 1.0 feet/minute the preferred range. The cast film is dried using a combination of heat and air flow, leaving a finished tape 0.002 to 0.025 inches thick.

Processing of the Tape Layers

The roll of dry tape is removed from the machine in then cut into squares and the polyethylene terephthalate is stripped off the ferrite tape. Metal is preferably applied by screen printing an ink containing gold metal powder, solvent and binders, such as terpineol and ethyl cellulose. Next, the metallized piece of unfired tape is placed on a tray and heated in an oven to approximately 70° C. to dry the ink. Screen printed patterns include metal circuitry, large ground plane areas, or a series of ground planes hooked together with metal connectors or any other metal pattern necessary to build the device. The ferrite tape may have one or more holes punched through it forming vias and each via would have a conductive metal, such as gold, introduced into the via providing a vertical connection between one layer and a layer above or below that layer. In this way, three dimensional patterns of metal can be formed. The metal patterns may form coils, groundplane, stripline, slotline or any other necessary conductive trace.

Lamination of the Layers

Each metallized layer is stacked in a prescribed order and is put through a process called lamination. The thermoplastic nature of the binders allows knitting of the layers into a monolithic piece. Preferred lamination conditions are pressures of 2000 to 3500 psi at temperatures ranging from 85° to 160° F., depending on the binder and plasticizer used as well as the surface area and particle size of the powder. It may be performed in a hydraulic press with or without a die, or in an isostatic press using a heated fluid or flexible mold. Lamination time is typically 20 minutes, depending on the part size and thickness.

Cofiring the Layers

The laminated stack is fired in a furnace using a controlled temperature, heating rate and atmosphere. A slow rate of heating is preferred to eliminate the binder before sintering occurs. A heating rate of 5° C. or less per hour in an air atmosphere has been used for parts up to 0.75 mm thick, up to 1000° C.

Figure 2:
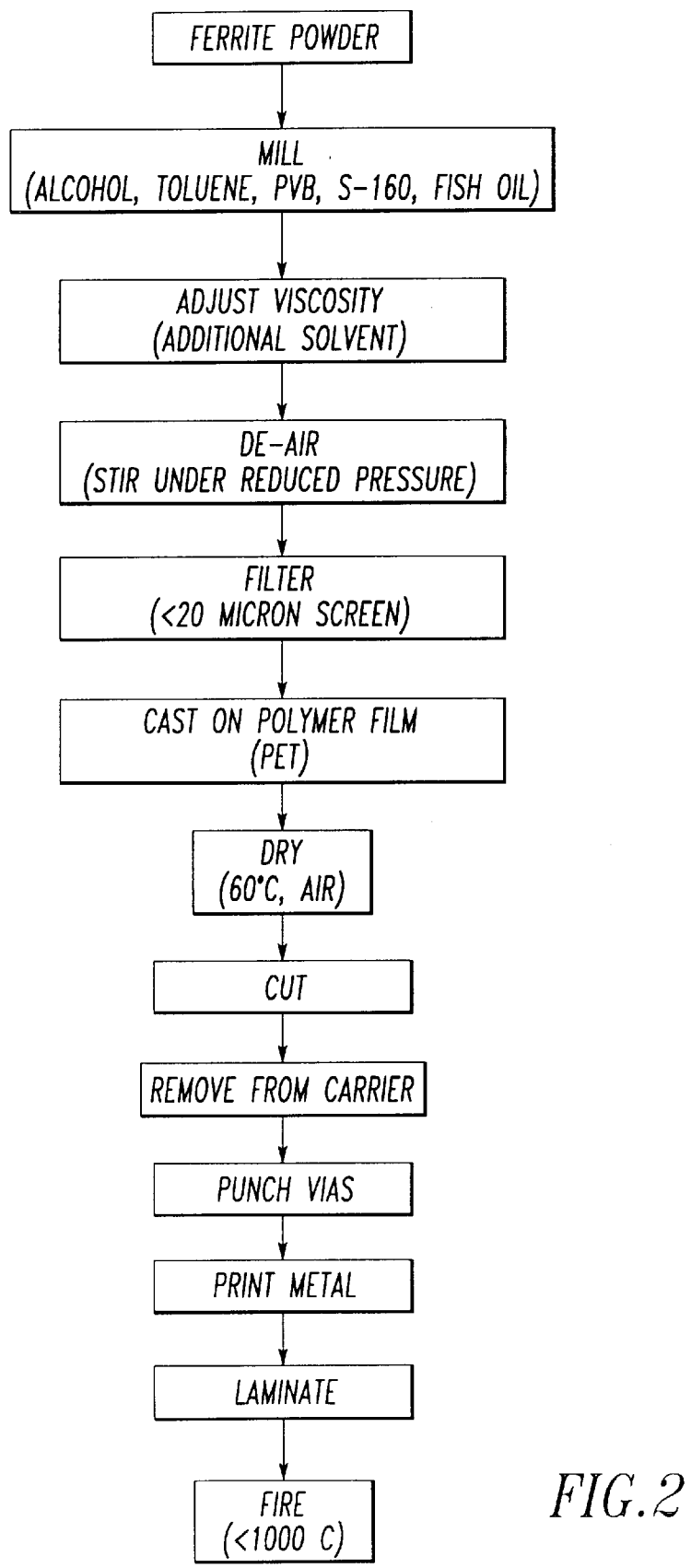
FIG. 2 is a schematic diagram of the preferred method showing the steps of tape casting the ferrite through firing the ferrite tape.

The method of tape casting through firing are schematically depicted in FIG. 2. Although a preferred tape casting formulation is shown in FIG. 2. Other binders, such as polycarbonates, acrylics, or water based systems such as methycellulose or polyvinyl alcohol can also be used, and are not critical to the process. Binder selection can be tailored to meet the needs of the metallization or other tapes as required. The use of these powders is not strictly limited to tape casting. Other ceramic forming processes such as pressing, slip casting, injection molding, or extrusion can also be used, but tape casting is the preferred fabrication method, since it enables multilayer electronic packaging.

Three preferred planar phase shifter device structures are described herein which cover three cases of microwave magnetic field orientation relative to the DC field in the ferrite. These geometries will also function in a latched or digital phase shifter mode, since a closed ferrite circuit and magnetic field pulse conductors are provided by these structural configurations. It is distinctly understood, however, that other phase shifter device and other microwave device structures may be fabricated according to the teachings of the present invention. Multilayering capability of the ferrite tape material allows for composite electrical requirements to be handled within a single substrate, thus solving many producibility and integration requirements for a low cost planar phase shifter.

Figure 3:
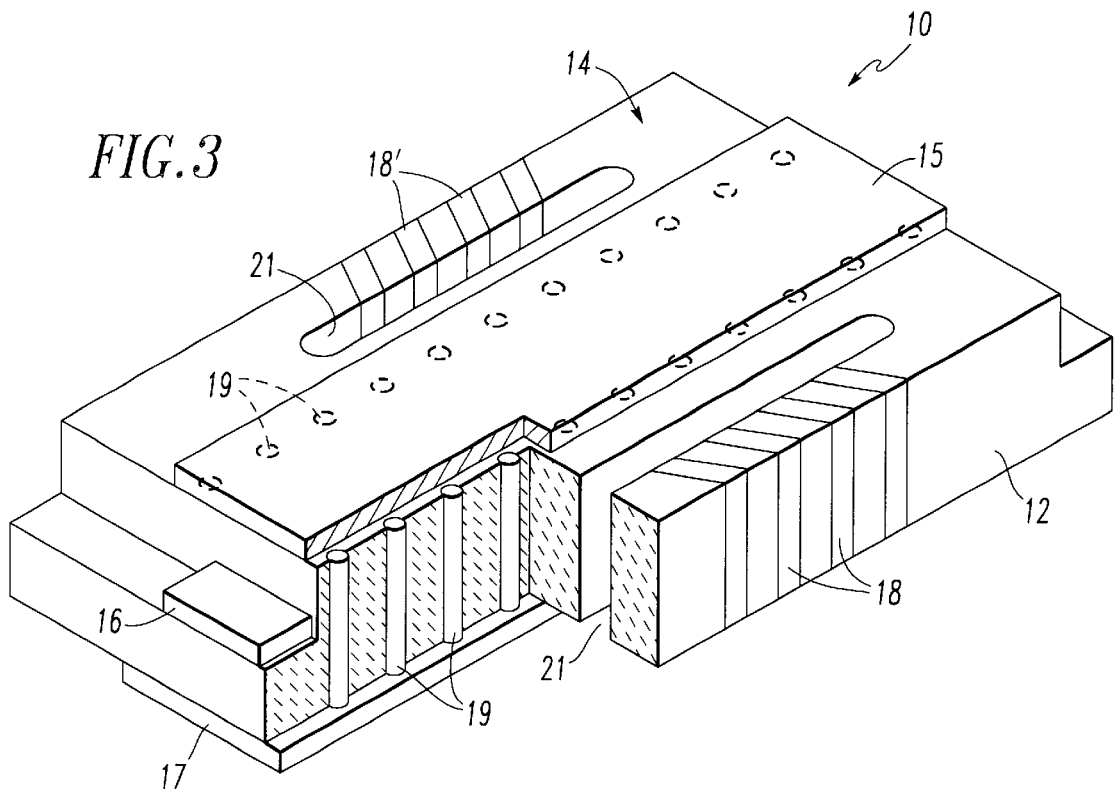
FIG. 3 is a perspective view of a first preferred planar phase shifter made according to the teachings of the present invention.

The stripline phase shifter 10 shown in FIG. 3 comprises a ferrite-filled stripline with two side branches containing the pulse conductors 12. The stripline conductor 16 runs the entire length of the phase shifter as does the microwave ground conductor 14. The two side branches on either side of the microwave stripline 16 and ground conductor 14 contain two continuous DC bias windings 18, 18'. The number of turns of the windings 18, 18' will vary based upon the design requirements of the phase shifter. The ground conductor 14 has an upper portion 15, a lower portion 17 and vertical posts 19 which connect the upper and lower portion 15, 17. The vertical posts 19 are preferably spaced apart a distance of one tenth or less of the wavelength of the RF signal with which the phase shifter is used. With the groundplane upper portion 15, lower portion 17 and side posts 19, the groundplane 14 resembles a square tube or a square coax. The stripline conductor runs through the center of the groundplane positions. Here the DC field in the central region is parallel to the stripline and perpendicular to the microwave magnetic fields around the stripline. This structure utilizes the interaction between a linearly polarized microwave magnetic field and the ferrite and results in a reciprocal phase shifter.

As mentioned more fully above with respect to the fabrication of phase shifter devices, the phase shifter shown in FIG. 3 (as well as the phase shifter shown in FIGS. 4 and 5, described below) has metal parts running through. In the embodiment of FIG. 3, slots 21 are provided through the ferrite on both sides of the groundplane 14. Vias filled with metal form the side posts 19 of the groundplane 14 and the coils 18, 18'. The ferrite tape is punched so that slots, holes or vias may be provided therethrough. The openings through the ferrite tape may be made by any convenient means. Creating the holes, slots and vias in the unfired prelaminated ferrite layers may be easily and inexpensively done upon the unfired ferrite layers. No expensive machining of fired ceramic parts is necessary.

Figure 4:
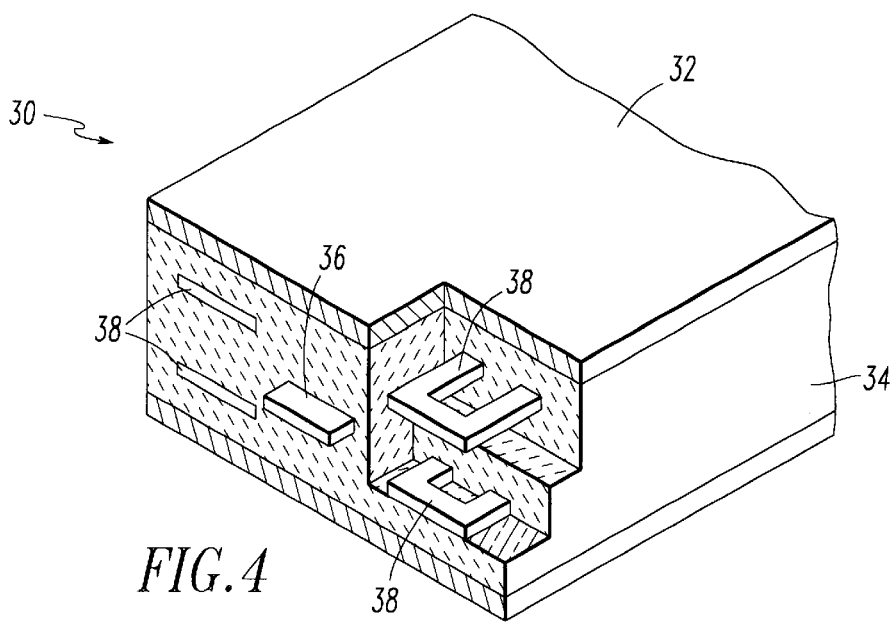
FIG. 4 is a second preferred planar phase shifter made according to the teachings of the present invention.

A second preferred phase shifter configuration 50 utilizing stripline is shown in FIG. 4. This device also has a stripline conductor 36 running the entire length of the phase shifter and has microwave ground 32 also running the entire length of the phase shifter. The side branches 34 contain DC bias windings 38. This configuration contains a more complex magnetic latching circuit arrangement than that shown in the device of FIG. 3 and is necessary to provide an internal DC magnetic field that is transverse to the microwave magnetic fields and normal to the stripline. This structure also utilizes the interaction between a linearly polarized microwave magnetic field and the ferrite and results in a reciprocal phase shifter.

Figure 5:
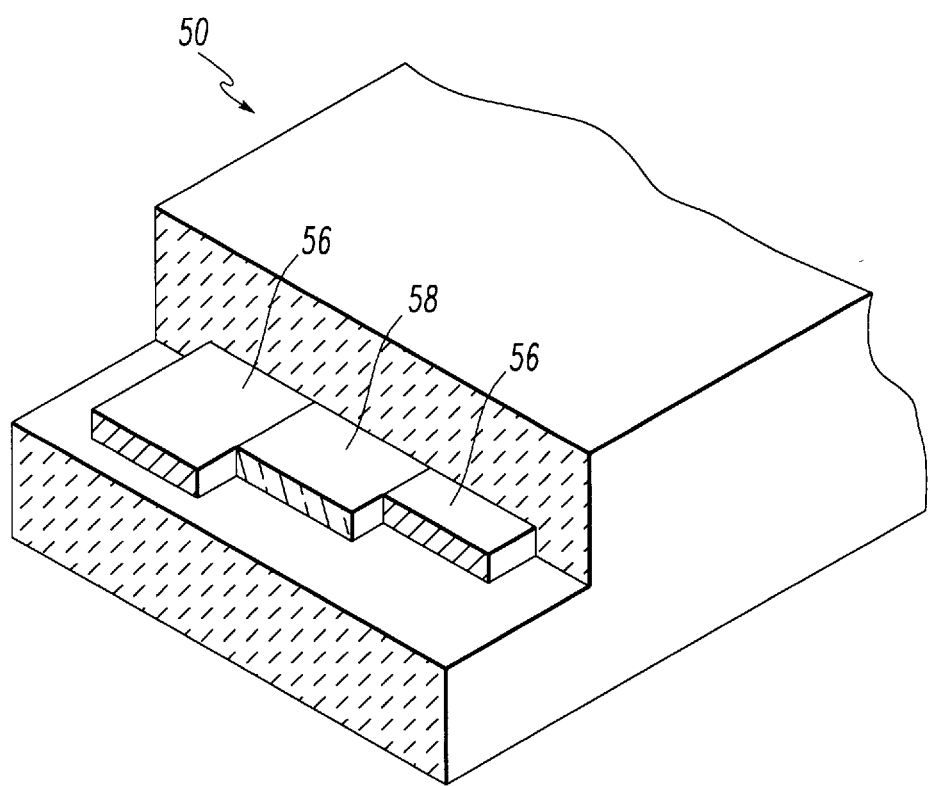
FIG. 5 is a third preferred planar phase shifter made according to the teachings of the present invention.

A third preferred phase shifter configuration 50 is shown in FIG. 5. This configuration relies on the interaction between the elliptically polarized microwave fields from the slot line 56 which runs the entire length of the phase shifter and can thus provide non-reciprocal phase shift. The arrangement shown, however, is a reciprocal phase shifter which uses the slotline or balanced line 56 to the magnetic field current pulse and thus achieves some simplification in fabrication. A dielectric material 58 is provided between the slotline. Dielectric material 58 preferably has different magnetic and dielectric properties than the surrounding ferrite. A non-reciprocal implementation would require magnetic DC fields which were in the same direction in both the upper and lower ferrite layers, necessitating a third ferrite layer to provide the field closure path. The interaction between a circularly polarized wave and the ferrite provides significantly more differential phase shift than the linearly polarized case, thus the non-reciprocal phase shifter provides a more compact, lower loss device.

While certain present preferred embodiments have been shown and described, it is distinctly understood that the invention is not limited thereto but may be otherwise embodied within the scope of the following claims.

We claim:

1. A process for fabricating a microwave power device comprising the steps of:
   (a) precipitating a ferrite powder through sol-gel chemical precipitation in a water-based system containing fully dissolved reactants;
   (b) filtering the solid precipitate from the liquids;
   (c) calcining the powder;
   (d) mixing the calcined ferrite powder together with a binder, a plasticizer and a solvent and mixing these materials to form a homogenized slip;
   (e) providing a thin layer of slip upon a section of backing material to form a tape;
   (f) drying the slip;
   (g) cutting the tape into a plurality of tape sections;
   (h) removing the backing material from the tape sections;
   (i) applying selected amounts of conductive metal in a selected pattern upon predetermined ones of the tape sections, the conductive metal having a predetermined melting point;

(j) stacking a number of layers of the tape sections, including tape sections having the conductive metal, in a desired order and laminating the stack of layers; and (k) firing the stack of layers to a temperature less than the melting point of the conductive metal and being approximately 800° C. to 1000° C., to thereby sinter the laminated layers into one integrated structure.

2. The process of claim 1 further comprising the step of placing selected numbers of vias through selected layers of tape and providing conductive metal in the vias.

3. The process of claim 1 wherein the device is a phase shifter.

4. The process of claim 3 wherein the conductive metal forms a groundplane.

5. The process of claim 3 wherein the conductive metal forms a coil.

6. The process of claim 3 wherein the conductive metal forms a stripline conductor.

7. The process of claim 3 wherein the conductive metal forms a slotline conductor.

8. The process of claim 1 wherein the device is a circulator.

9. The process of claim 1 further comprising the step of placing the precipitated ferrite powder in a drying oven prior to calcining the powder.

10. The process of claim 1 wherein the powder is calcined at a temperature of between approximately 200° C. and 800° C.

11. The process of claim 1 wherein the backing material is polyethylene terephthalate.

12. The process of claim 1 wherein the ferrite slip is provided upon the backing material through a doctor blade process.

13. The process of claim 1 wherein the ferrite slip is provided upon the backing material by extrusion.

14. The process of claim 1 further comprising the step of heating selected layers of ferrite having conductive metal deposited thereon to remove solvents in the metal prior to the stacking and lamination steps.

15. The process of claim 1 wherein the conductive metal is at least one of gold and silver.

16. The process of claim 1 wherein the ferrite powder is one of a lithium ferrite and a magnesium ferrite.

* * * * *